(12) United States Patent
Ho

(10) Patent No.: US 8,750,305 B2
(45) Date of Patent: Jun. 10, 2014

(54) TWO-HOP STAR NETWORK TOPOLOGY EXTENSION

(75) Inventor: Jin-Meng Ho, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 268 days.

(21) Appl. No.: 13/167,615

(22) Filed: Jun. 23, 2011

(65) Prior Publication Data

US 2011/0317702 A1 Dec. 29, 2011

Related U.S. Application Data

(60) Provisional application No. 61/358,088, filed on Jun. 24, 2010.

(51) Int. Cl.
*H04L 12/28* (2006.01)
*H04L 12/56* (2006.01)
*H04B 7/14* (2006.01)
*H04W 4/00* (2009.01)

(52) U.S. Cl.
USPC .......................... 370/392; 370/315; 370/331

(58) Field of Classification Search
USPC ......................................................... 370/392
See application file for complete search history.

(56) References Cited

U.S. PATENT DOCUMENTS

| 2006/0050690 A1* | 3/2006 | Epps et al. .................... 370/359 |
| 2010/0042838 A1 | 2/2010 | Ho |
| 2010/0195552 A1 | 8/2010 | Ho |
| 2010/0195603 A1 | 8/2010 | Ho |
| 2010/0195664 A1 | 8/2010 | Ho |
| 2010/0199091 A1 | 8/2010 | Ho |
| 2010/0199094 A1 | 8/2010 | Ho |
| 2010/0199095 A1 | 8/2010 | Ho |
| 2010/0202354 A1 | 8/2010 | Ho |
| 2010/0220645 A1* | 9/2010 | Kwon et al. .................. 370/315 |
| 2011/0038360 A1 | 2/2011 | Ho |
| 2011/0075684 A1* | 3/2011 | Zeng et al. .................... 370/475 |
| 2011/0087884 A1 | 4/2011 | Ho |
| 2011/0134842 A1 | 6/2011 | Ho |

OTHER PUBLICATIONS

Robust Optical Burst Switching (2004), Author: Abdelilah Maach, Gregor V. Bochmann, Hussein Mouftah; In Proc. of Networks'2004 http://citeseerx.ist.psu.edu/viewdoc/summary?doi=10.1.1.112.8303.*
Ho, Jin-Meng, "Some Proposed Changes to IEEE P802.15.6/D01 MAC and Security Subclauses," Project: IEEE P802.15 Working Group for Wireless Personal Area Networks (WPANs), (uploaded to IEEE P802.15 server), Sep. 6, 2010, (258 pages).

* cited by examiner

*Primary Examiner* — Noel Beharry
(74) *Attorney, Agent, or Firm* — Steven A. Shaw; Wade James Brady, III; Frederick J. Telecky, Jr.

(57) ABSTRACT

Relayed nodes communicate with a target hub using a relaying node in a two-hop star network. The relayed nodes transmit a first encapsulating frame having a payload that comprises an encapsulated frame. The first encapsulating frame is formatted as a one-hop communication between the relayed node and the relaying node. The encapsulated frame is formatted as a one-hop communicate between the relayed node and the target hub. The relaying node generates a second encapsulating frame having a payload that comprises the encapsulated frame from the relayed node. The second encapsulating frame is formatted as a one-hop communication from between the relaying node and the target hub. The target hub sends frames to the relayed node in a similar manner through the relaying node. The target hub and relaying node communicate during scheduled uplink, downlink, or bilink allocations, and the relaying node and the relayed node communicate during scheduled bilink allocations.

1 Claim, 5 Drawing Sheets

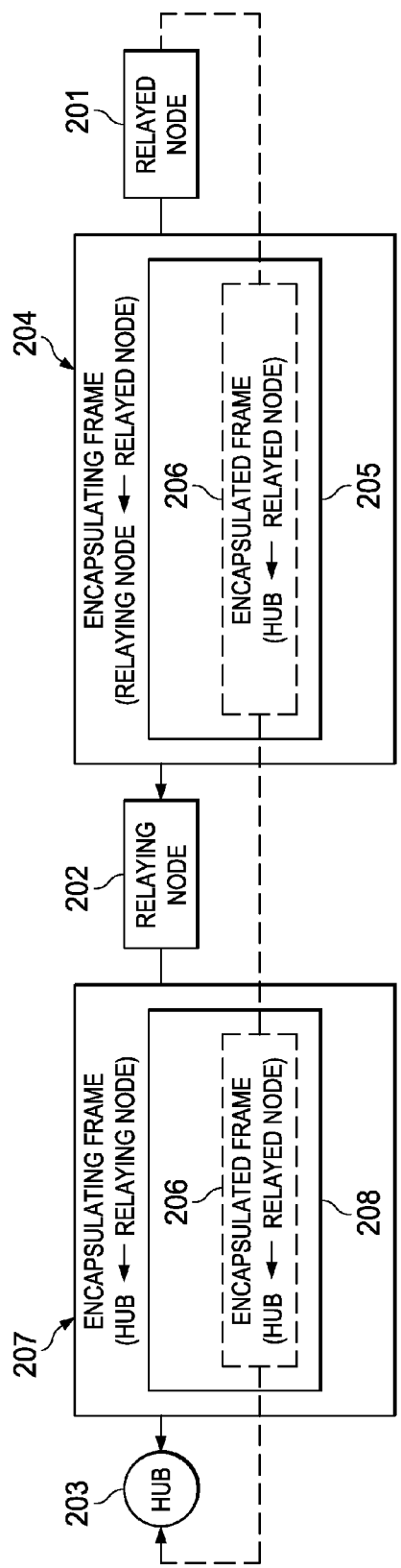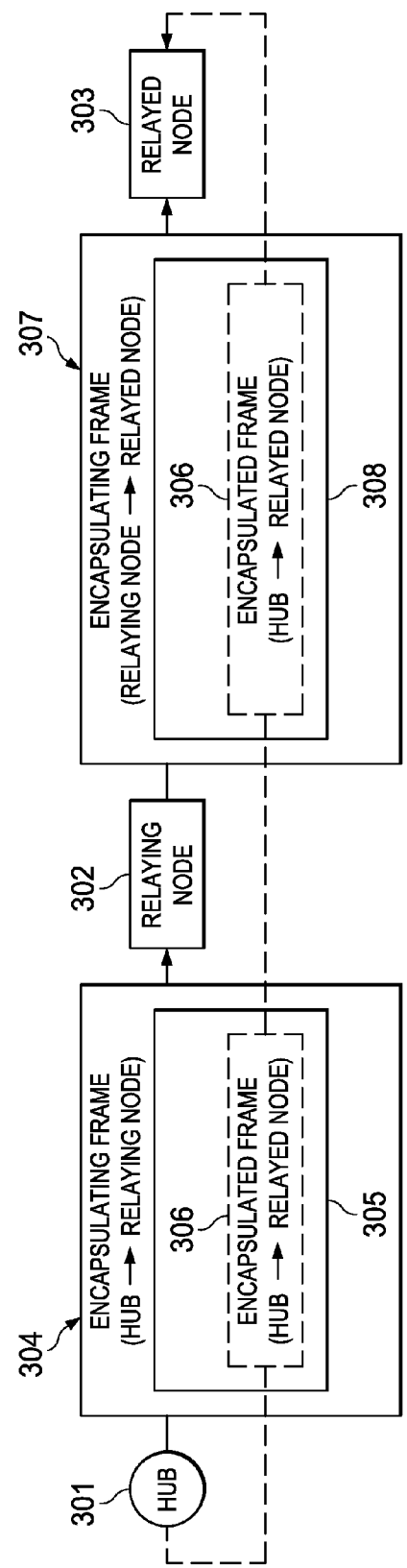

TWO-HOP STAR NETWORK TOPOLOGY EXTENSION

CROSS-REFERENCE TO RELATED APPLICATIONS

The present application claims the benefit of the filing date of U.S. Provisional Patent Application No. 61/358,088, which is titled "Two-Hop Star Topology Extension" and was filed Jun. 24, 2010, the disclosure of which is hereby incorporated by reference herein in its entirety.

TECHNICAL FIELD

Embodiments of the invention are directed, in general, to devices communicating in a network, such as a Body Area Network (BAN), and, more specifically, to providing communications between two devices through a relaying node device.

BACKGROUND

In a star network configuration, a hub device communicates directly with a plurality of node devices. The hub and node devices that are directly connected communicate in "one hop." The ability to communicate directly with the hub requires that the node is able to detect transmissions from the hub and vice versa. The distance between the hub and node and/or the power of the signal transmitted by the hub may prevent some nodes from detecting the hub and vice versa. Therefore, not all nodes that need or want to communicate with the hub are able to establish a direct connection. Nodes that are located at a distance from the hub and that cannot communicate directly with the hub may use an intermediate node to relay communications to and from the hub. This use of a relay allows the remote nodes to communicate with the hub in "two hops." Supporting frame structures and functional behaviors are lacking in existing solutions, but are essential to medium access in a two-hop extended network.

SUMMARY OF THE INVENTION

Embodiments of the invention enable two-hop extended communications using frame structures and MAC functions that are based on those for the one-hop star network. Two-hop extended access is thereby achieved using the building blocks for a one-hop star network, which minimizes the implementation complexity for the two-hop functionality.

In one embodiment, a relayed node uses a relaying node to send management and data frames to a target hub. The relayed node generates a first encapsulating frame with a payload that comprises an encapsulated frame and sends the first encapsulating frame to the relaying node. The first encapsulating frame is formatted as a one-hop communication between the relayed node and the relaying node. The encapsulated frame is formatted as a one-hop communication between the relayed node and the target hub. The relaying node creates a second encapsulating frame having a payload that comprises the encapsulated frame. The second encapsulating frame is formatted as a one-hop communication between the relaying node and the target hub.

Similarly, the target hub uses the relaying node to send management and data frames to the relayed node. The target hub generates a first encapsulating frame with a payload that comprises an encapsulated frame and sends the first encapsulating frame to the relaying node. The first encapsulating frame is formatted as a one-hop communication between the target hub and the relaying node. The encapsulated frame is formatted as a one-hop communication between the target hub and the relayed node. The relaying node creates a second encapsulating frame having a payload that comprises the encapsulated frame. The second encapsulating frame is formatted as a one-hop communication between the relaying node and the relayed node.

The target hub specifies a connection assignment for a two-hop extension using two encapsulating connection assignment frames. A first encapsulating connection assignment frame is sent by the target hub to the relayed node through the relaying node. The first encapsulating connection assignment frame has a payload comprising a first encapsulated connection assignment frame. The relaying node forwards the first encapsulated connection assignment frame to the relayed node in a separate first connection assignment encapsulating frame. The first encapsulated connection assignment frame defines an uplink, downlink, or bilink scheduled allocation between the target hub and the relaying node. The first encapsulated connection assignment frame further defines a bilink scheduled allocation between the relaying node and the relayed node. A second encapsulating connection assignment frame is sent by the target hub to the relaying node. The second encapsulating connection assignment frame has a payload comprising a second encapsulated connection assignment frame. The second encapsulated connection assignment frame has a sender identifier that is set to the relayed node to indicate that the connection assignment is for a two-hop extension to the relayed node. The second encapsulated connection assignment frame also defines an uplink, downlink, or bilink scheduled allocation between the target hub and the relaying node as well as a bilink scheduled allocation between the relaying node and the relayed node.

In one embodiment, the relaying node broadcasts timed frames, such as T-Poll frames, during scheduled allocation intervals. The timed frames provide a shared polled allocation to potential relayed node, which may transmit encapsulating frames to the relaying node during the shared polled allocation. The relaying node then transmits encapsulating frames to the target hub during its scheduled uplink allocation intervals. The encapsulating frames sent to the target hub include a payload having the same encapsulated frame as carried in the encapsulating frame from the relayed node of interest.

BRIEF DESCRIPTION OF THE DRAWINGS

Figure 1:
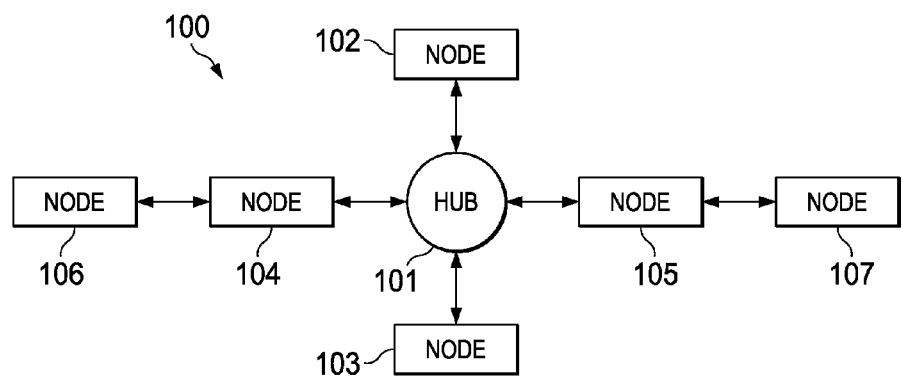
Figure 8:
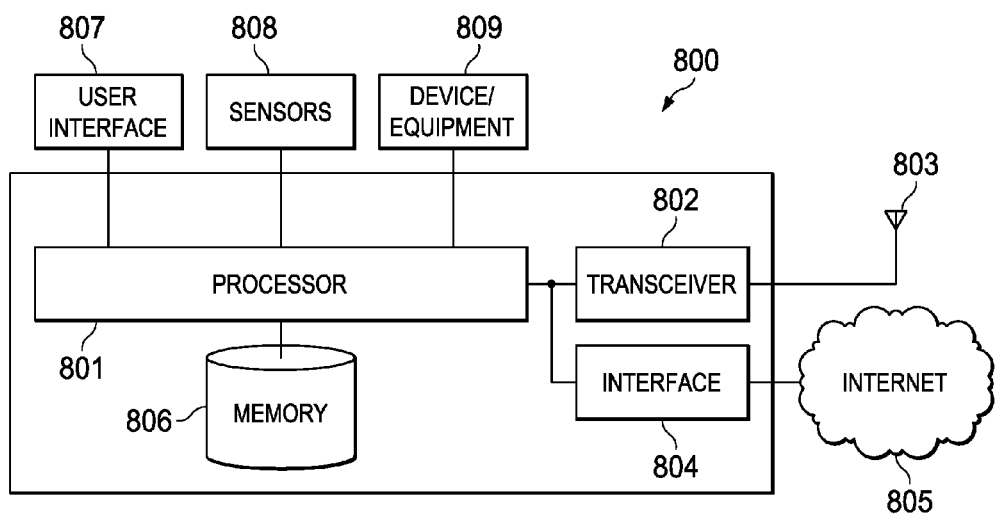
Figure 4:
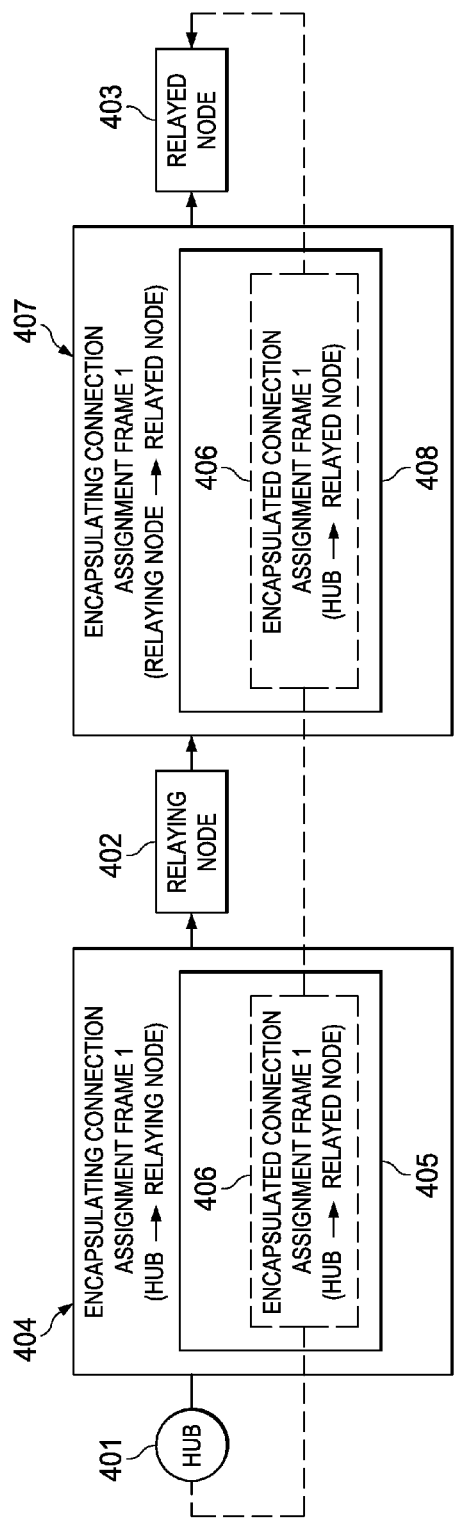
Figure 5:
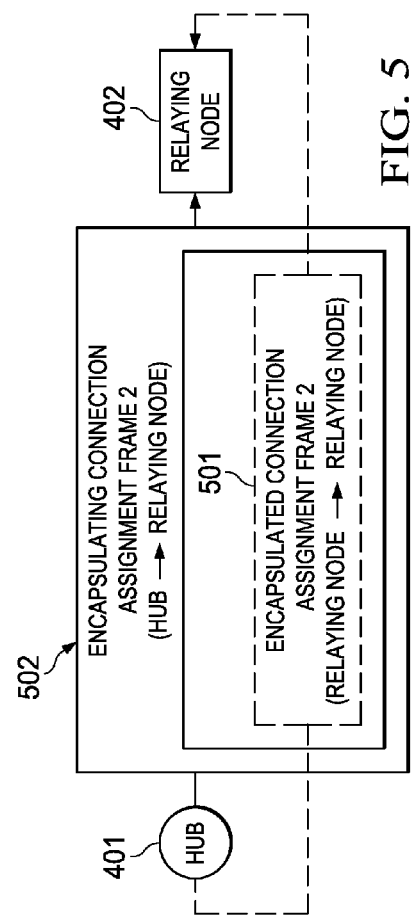
Figure 6:
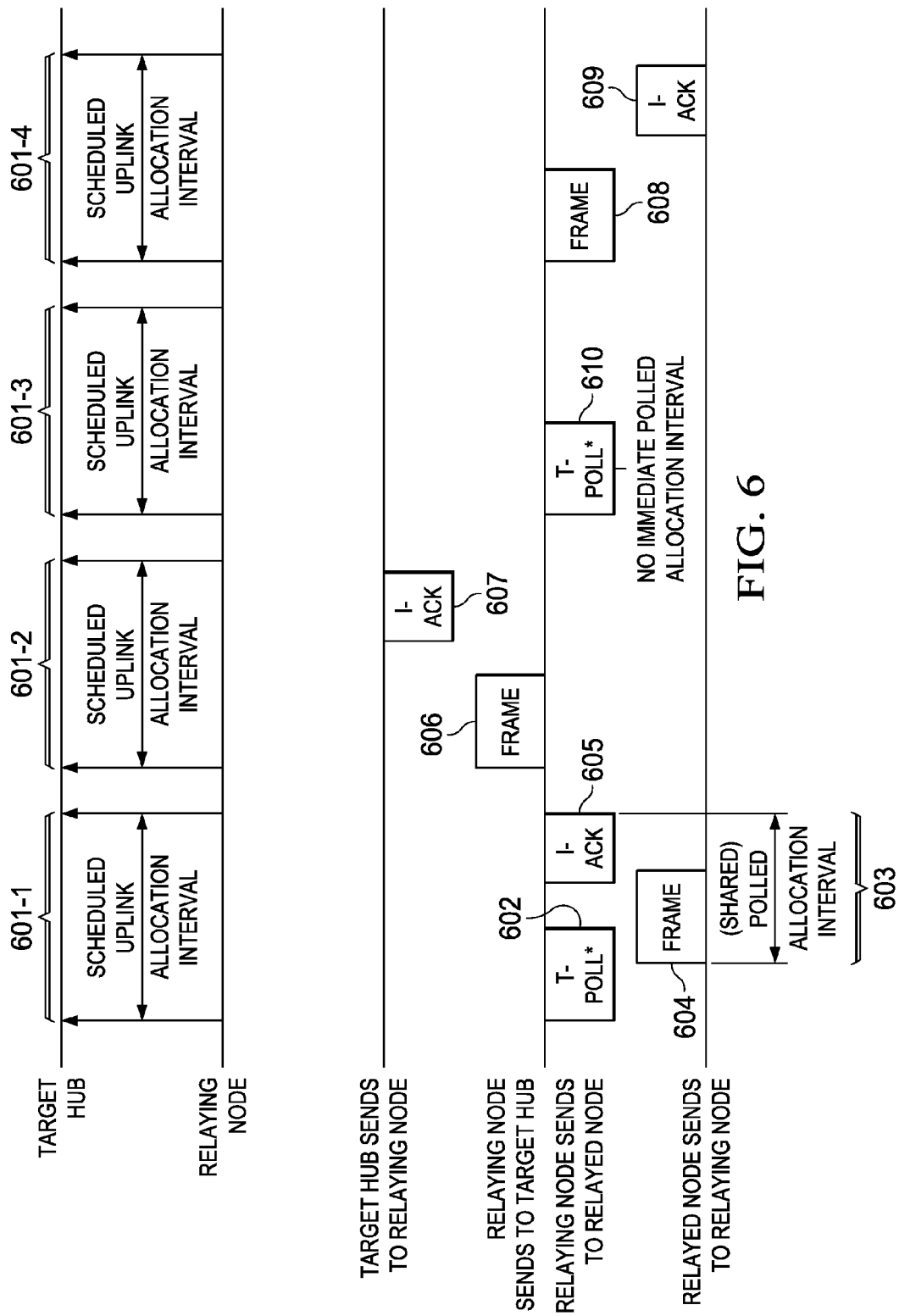
Figure 7:
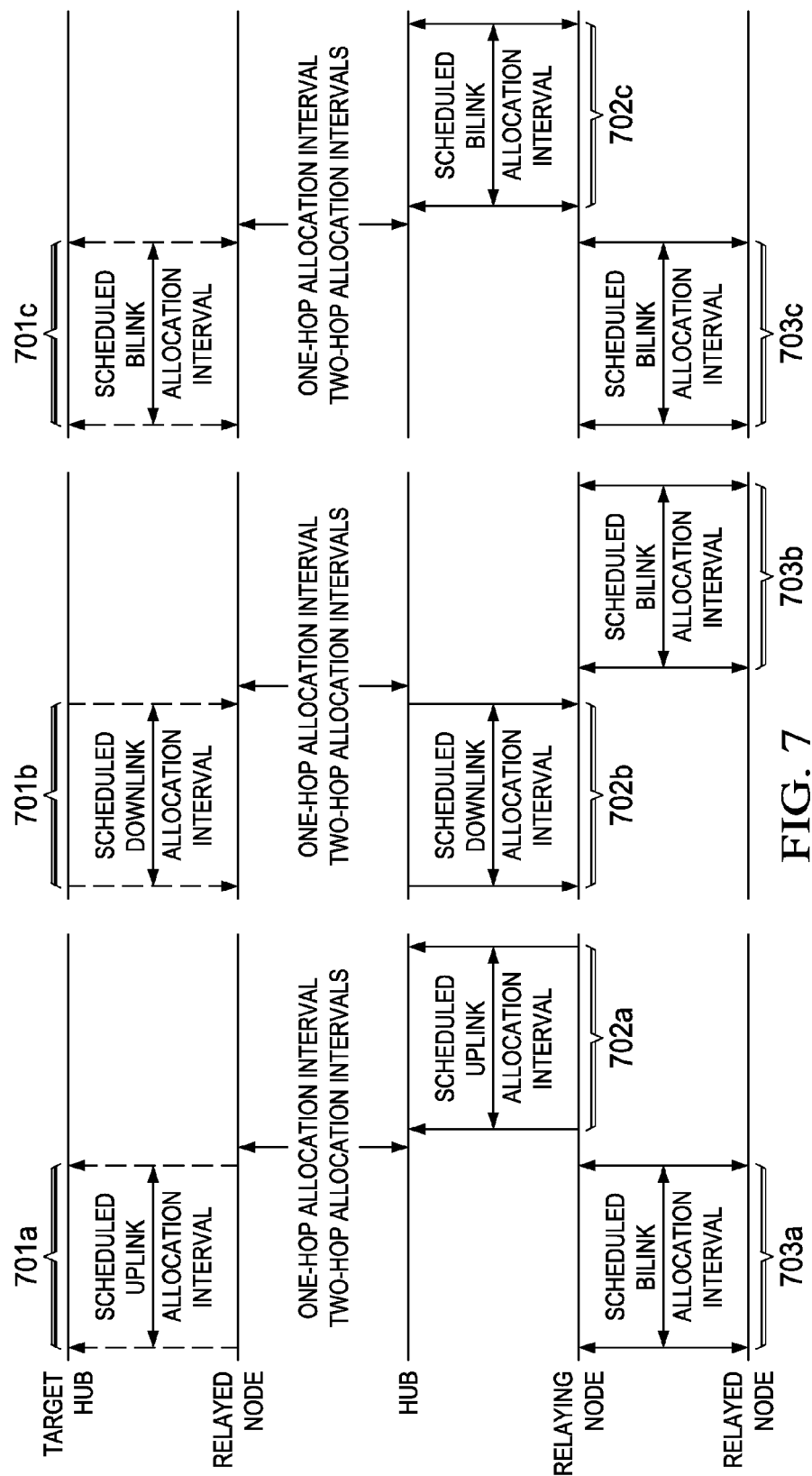

Having thus described the invention in general terms, reference will now be made to the accompanying drawings, wherein:

FIG. 1 illustrates a star network in which a hub is in communication with a number of nodes, using direct (one-hop) and relayed (two-hop) transmissions;

FIG. 2 illustrates transmission of management or data type frames from a relayed node through a relaying node to a target hub using a combination of direct and relayed transmissions;

FIG. 3 illustrates transmission of management or data type frames from a target hub through a relaying node to a relayed node using a combination of direct and relayed transmissions;

FIG. 4 illustrates transmission of a connection assignment from a target hub through a relaying node to a relayed node;

FIG. 5 illustrates transmission of a connection assignment from a target hub to a relaying node;

FIG. 6 illustrates a process for using a scheduled uplink allocation for a relaying node to send timed frames, such as broadcast T-Polls, and to relay frames;

FIG. 7 illustrates equivalent one-hop and two-hop scheduled allocations for uplink, downlink and bilink allocations; and FIG. 8 is a block diagram of an exemplary embodiment of a device for implementing embodiments of the invention.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 illustrates a star network 100 in which hub 101 is in communication with a number of nodes 102-107. Hub 101 is in direct communication with nodes 102-105. The direct connections between hub 101 and nodes 102-105 are referred to herein as a one-hop communication. Hub 101 and nodes 106, 107 use a two-hop extension to exchange frames through intermediate relaying nodes 104, 105. Intermediate node 104, for example, is capable of direct communication with both hub 101 and node 106. Node 104 is referred to herein as a relaying node, and node 106 is referred to herein as a relayed node. Hub 101 is referred to as the target hub of the relayed node 106. FIG. 1 illustrates a first two-hop extension between relayed node 106 and target hub 101 via relaying node 104 and a second two-hop extension between related node 107 and target hub 101 via relaying node 105.

Both a relayed node and a target hub are capable of initiating a two-hop extension. The two-hop extension may be initiated at any time deemed appropriate by the initiating node. For example, the two-hop extension may be initiated by either a (target) hub or a (relayed) node when either the signal strength or the signal-to-noise ratio detected between the target hub and the relayed node is below a specified level. In one embodiment, the relayed node and the target hub may have been in direct communication with each other prior to initiating the two-hop extension. Alternatively, the relayed node and the target hub may never have been in direct communication—so that their only communication is via a relaying node in a two-hop extension.

In addition to forwarding or relaying frames from the relayed node, the relaying node may directly exchange its own frames with the hub just as in a one-hop star network.

In one embodiment, the target hub, relaying node, and relayed node may comply with the "Draft Standard for Information Technology—Telecommunications and Information Exchange Between systems—Local and Metropolitan Area Networks—Specific Requirements—Part 15.6: Wireless Medium Access Control (MAC) and Physical Layer (PHY) Specifications for Wireless Personal Area Networks (WPANs) used in or around a body," IEEE P802.15.6™/D04, June 2011, the disclosure of which is hereby incorporated by reference herein in its entirety, or with the procedures specified in any other relevant protocol.

FIGS. 2-5 illustrate frame encapsulation methods used by the relayed node and the target hub to exchange unicast management or data type frames through the relaying node using a two-hop extension. In one embodiment, the relayed node, the relaying node, and the target hub do not apply frame encapsulation to control type frames, such as I-Ack (immediate acknowledgment) frames. In FIG. 2-5, solid lines represent direct transmission between two devices, which may be two nodes or a node and a hub, and dashed lines represent relayed transmission between two devices. Solid boxes represent encapsulating frames and their payload, while dashed boxes represent an encapsulated frame carried as the payload of a encapsulating frame.

Although not directly in contact with each other, the relayed node and the target hub may follow the MAC (medium access control) and security state diagrams specified in the relevant protocol for a one-hop star network to exchange the encapsulated frames through the relaying node. Accordingly, the relayed node and target hub exchange encapsulated frames through the relaying node as if they were in direct communication and apply the appropriate security level for both transmission and reception of the encapsulated frames.

The relaying node and the target hub may follow the MAC and security state diagrams specified in the relevant protocol for a one-hop star network to exchange frames, whether encapsulated or not. The relaying node and the target hub exchange frames as if the relaying node were a non-relaying node and apply the appropriate security level for both transmission and reception of the frames.

The relayed node and the relaying node may follow the MAC and security state diagrams specified in the relevant protocol for a one-hop star network to exchange frames, whether encapsulated or not. The relayed node and relaying node exchange frames as if the relaying node were a hub and apply the appropriate security level for both transmission and reception of the frames. The relayed node and the relaying node operate with the following exception when exchanging frames for a two-hop extension. The nodes are not connected with each other in the way a node and a hub would be in a one-hop star network. For example, the relayed and relaying nodes do not exchange Connection Request and Connection Assignment frames not encapsulating another frame.

Management and Data Type Frame Exchanges

FIG. 2 illustrates transmission of management or data type frames from relayed node 201 through relaying node 202 to target hub 203 using a combination of direct and relayed transmissions. Relayed node 201 sends encapsulating frame 204 to relaying node 202. Encapsulating frame 204 carries a payload 205, which corresponds to an encapsulated frame 206 that is sent from relayed node 201 to target hub 203. Relaying node 202 sends encapsulating frame 207 to target hub 203. Encapsulating frame 207 carries a payload 208, which corresponds to the encapsulated frame 206 sent in the payload 205 of encapsulating frame 204 from relayed node 201 to target hub 203. In one embodiment, the frame type and subtype of encapsulating frames 204 and 207 correspond to the same frame type and subtype of the encapsulated frame 206.

To send a management type frame or a data type frame as an encapsulated frame through the relaying node 202 to the target hub 201 as shown in FIG. 2, relayed node 201 first sends encapsulating frame 204 to the relaying node 202. In the encapsulating frame 204:

the Recipient Identifier (ID) field is set to the Node Identifier (NID) of the relaying node 202;

a Relay bit or field in the MAC header for encapsulating frame 204 is set to one or some other value to indicate that the payload of frame 204 comprises an encapsulated frame for relay;

the other fields of the MAC header in frame 204 are set as if relaying node 202 were a hub and as if relayed node 201 were sending encapsulating frame 204 to that hub (i.e. 202) without frame encapsulation in a one-hop star network. For example, frame type and frame subtype fields may be set to the corresponding values of their counterparts in encapsulated frame 206; and the frame payload 205 carries encapsulated frame 206, which is formatted as if relayed node 201 were sending encapsulated frame 206 directly to target hub 203 for the first time in a one-hop star network.

The recipient ID field of the MAC header for the encapsulated frame 206 is set to zero if relayed node 201 does not yet know the hub identifier (HID) of target hub 201. In one embodiment, if relayed node 201 does not yet have a connected_NID, it treats an unconnected_NID as its NID in receiving an expected I-Ack frame from relaying node 202.

Upon receiving encapsulating frame 204, such as a management or data type frame with the Relay field of the MAC header set to one, relaying node 202 processes encapsulating frame 204 as a typical frame as specified in the relevant protocol for a one-hop star network with the following additional considerations:

the Sender ID field of the MAC header is set to the NID of relayed node 201;

the frame payload, after appropriate security is applied, is an encapsulated frame 206; and the Relay field of the MAC header of any required I-Ack frame is set to one if relay is feasible, or is set to zero otherwise.

Relay is feasible if the relaying node is capable of providing relay between the relayed node and the target hub, and if the target hub is capable of being a relayed hub as indicated in its MAC Capability field. If relay is feasible for relaying node 202, then relaying node 202 sends an encapsulating frame 207 to target hub 201. In the encapsulating frame 207:

the Relay field of the MAC header is set to one;

the other fields of the MAC header are set as if the relaying node were sending encapsulated frame 206 to target hub 203 without frame encapsulation in a one-hop star network; and the frame payload 208 carries encapsulated frame 206 to be next relayed to target hub 203.

Upon receiving encapsulating frame 207, which may be a management or data type frame with the Relay field of the MAC header set to one, target hub 203 processes encapsulating frame 207 as a typical frame as specified in the relevant protocol for a one-hop star network with the following additional considerations:

frame 207 is not a duplicate of another frame with the Relay field of the MAC header set to zero, even if frame 207 would be otherwise treated as a duplicate as specified in the relevant protocol for a one-hop star network;

frame payload 208, after appropriate security is applied, is an encapsulated frame 206; and the Relay field of the MAC header of any required I-Ack frame is set to one if hub 203 is capable of being a relayed hub as announced in its MAC Capability field, or is set to zero otherwise.

In one embodiment, if relayed node 203 does not yet have a connected_NID assigned by target hub 203, such as if the sender ID field of the MAC header of encapsulated frame 206 is set to an unconnected_NID, then target hub 203 keeps the unconnected_NID as the NID for relayed node 201. Alternatively, target hub 203 may assign a connected_NID as specified in the relevant protocol as the NID for relayed node 201.

FIG. 3 illustrates transmission of management or data type frames from target hub 301 through relaying node 302 to relayed node 303 using a combination of direct and relayed transmissions similar to those used in FIG. 2. Hub 301 sends encapsulating frame 304 to relaying node 302. Encapsulating frame 304 carries payload 305, which corresponds to an encapsulated frame 306 sent from hub 301 to relayed node 303. Relaying node 302 sends encapsulating frame 307 to relayed node 303. Encapsulating frame 307 carries payload 308, which corresponds to encapsulated frame 306 sent in payload 305 from hub 301 to relayed node 303. In one embodiment, the frame type and subtype of encapsulating frames 304 and 307 correspond to the same frame type and subtype of the encapsulated frame 306.

To send a management type frame or a data type frame as an encapsulated frame through relaying node 302 to relayed node 303 as illustrated in FIG. 3, target hub 301 sends encapsulating frame 304 to relaying node 302. In the encapsulating frame 304:

a Relay field of the MAC header is set to one;

the other fields of the MAC header are set as if target hub 301 were sending encapsulated frame 306 to relaying node 302 without frame encapsulation in a one-hop star network;

frame payload 305 carries encapsulated frame 306, which is formatted as if target hub 301 were sending encapsulated frame 306 directly to relayed node 303 for the first time in a one-hop star network; and a field that defines the data rates requested for use to send acknowledgment data frames, such as a Requested Acknowledgment Data Rates field, for frame payload of encapsulated frame 306 is set as if the node and the hub relevant to that field were relayed node 303 and relaying node 302, respectively.

Upon receiving encapsulating frame 304, such as a management or data type frame with a Relay field of the MAC header set to one, relaying node 302 processes the frame as specified in the relevant protocol for a one-hop star network with the following additional considerations:

frame 304 is not a duplicate of another frame with a Relay field of the MAC header set to zero even if it would be otherwise treated as a duplicate as specified in the relevant protocol for a one-hop star network;

frame payload 305, after appropriate security is applied, is an encapsulated frame 306; and the Relay field of the MAC header of any required I-Ack frame is set to one if relay is feasible or is set to zero otherwise.

Relay is feasible if relaying node 302 is capable of providing relay between target hub 301 and relayed node 303. If relay is feasible, relaying node 302 sends encapsulating frame 307 to relayed node 303. In encapsulating frame 307:

the Recipient ID field of the MAC header is set to the NID of relayed node 303, which is the recipient ID of the MAC header of encapsulated frame 306;

the Sender ID field of the MAC header is set to the NID of relaying node 302;

the Relay field of the MAC header is set to one;

the other fields of the MAC header are set as if relaying node 392 were a hub that is sending encapsulated frame 306 to relayed node 303 without frame encapsulation in a one-hop star network; and frame payload 308 carries encapsulated frame 306 to be next relayed to relayed node 303.

If relayed node 303 does not yet have a connected_NID, then it treats an unconnected_NID or any connected_NID as its NID in receiving an expected encapsulating frame 307.

Upon receiving encapsulating frame 307, which may be a management or data type frame with a Relay field of the MAC header set to one, relayed node 303 processes encapsulating frame 307 as specified in the relevant protocol for a one-hop star network with the following additional considerations:

the Sender ID field of the MAC header is set to the NID of relaying node 302;

frame payload 308, after appropriate security is applied, is encapsulated frame 306; and the Relay field of the MAC header of any required I-Ack frame is set to one if relayed node 303 is capable of being a relayed node as announced in its MAC Capability field, or is set to zero otherwise.

Connection Assignment Frame Exchanges

The frame encapsulation methods illustrated in FIGS. 2 and 3 do not allow the relaying node to interpret the frame payload of an encapsulated frame sent from the relayed node to the target hub or vice versa, if the relayed node and the target hub apply encryption to the frame payload of the encapsulated frame. This is acceptable and even desirable, since the relaying node is not supposed to be able to understand the frame payload of a frame not destined to itself, except for connection assignment. If the encapsulated frame is a Connection Assignment frame, the relaying node needs to understand and interpret the frame payload of the frame, so as to know the scheduled allocations pertaining to the relaying node and the relayed node and to the target hub and the relaying node for the two-hop communication between the relayed node and the target hub. Thus, FIGS. 2 and 3 are not used to send frames used to grant scheduled allocations, such as a Connection Assignment frame. To specify connection assignment for a two-hop extension involving a relaying node and a relayed node, the target hub sends two encapsulated connection assignment frames 1 and 2 in two encapsulating connection assignment frames 1 and 2 to the relayed node and the relaying node, respectively, as illustrated in FIGS. 4 and 5.

FIG. 4 illustrates transmission of a connection assignment from target hub 401 through relaying node 402 to relayed node 403. Hub 401 sends encapsulating frame 404 to relaying node 402. Encapsulating frame 404 carries payload 405, which corresponds to an encapsulated frame 406 sent from hub 401 to relayed node 403. Relaying node 402 sends encapsulating frame 407 to relayed node 403. Encapsulating frame 407 carries payload 408, which corresponds to encapsulated frame 406 sent in payload 405 from hub 401 to relayed node 403.

To send encapsulated Connection Assignment frame 1 (406) through relaying-capable node 402 to relayed node 40, target hub 401 and relaying node 402 follow the frame transmission procedure as illustrated in FIG. 3 and as described above, with the following modifications made to frame payload of encapsulated Connection Assignment frame 1 (406):

the MAC Capability and PHY Capability fields are set to those for relaying node 402;

the Assigned Acknowledgement Data Rates field, which defines the data rates assigned for use to send acknowledgement data frames, is set as if the node and the hub relevant to that field were relayed node 403 and relaying node 402, respectively;

the Connection Change Indicator field is set such that it accounts for all the included information elements (IE) defining both hops; and after each Uplink Assignment, Downlink Assignment, or Bilink Assignment IE defining the assignment of scheduled allocations applicable between target hub 401 and relaying node 402 for the two-hop extension, another Uplink Assignment, Downlink Assignment, or Bilink Assignment IE is inserted defining the assignment of scheduled allocations applicable between relaying node 402 and relayed node 403 for the corresponding two-hop extension. The relaying node 402 is considered as a hub for link direction referencing purposes.

Upon processing the assignment of scheduled allocations applicable between target hub 401 and relaying node 402, the relayed node 403 may listen in those scheduled allocations to determine if it (403) can be in a one-hop communication with target hub 401.

FIG. 5 illustrates transmission of a connection assignment from target hub 401 to relaying node 402. To send encapsulated Connection Assignment frame 2 (501) to relay-capable node 402, target hub 401 sends encapsulating Connection Assignment frame 2 (502) to the relaying node 402, wherein the Relay field of the MAC header is set to one;

the other fields of the MAC header are set as if target hub 401 were sending encapsulated Connection Assignment frame 2 to relaying node 402 without frame encapsulation in a one-hop star network; and the frame payload is set to encapsulated Connection Assignment frame 2 (501), which is formatted as if target hub 401 were sending the frame directly to relaying node 402 for the first time in a one-hop star network, with some modifications to support the two-hop extension.

In particular, encapsulated Connection Assignment frame 2 (501) is formatted with the following modifications:

in the MAC header, the sender ID field is set to the NID of relayed node 403 to indicate that the connection assignment is for a two-hop extension to relayed node 403; and in the frame payload:

the Assigned Wakeup Phase and Assigned Wakeup Period fields are set to those for relayed node 403;

the MAC Capability and PHY Capability fields are set to those for relayed node 403 if they are known to target hub 401, or are set to zero otherwise;

the Assigned Acknowledgement Data Rates field is set as if the node and the hub relevant to that field were relayed node 403 and relaying node 402, respectively;

a Connection Change Indicator field is set such that it accounts for all the included IEs defining both hops; and after each Uplink Assignment, Downlink Assignment, or Bilink Assignment IE defining the assignment of scheduled allocations applicable between target hub 401 and relaying node 402 for the two-hop extension, another Uplink Assignment, Downlink Assignment, or Bilink Assignment IE is inserted defining the assignment of scheduled allocations applicable between relaying node 402 and relayed node 403 for the corresponding two-hop extension, with relaying node 403 considered as a hub for link direction referencing purposes.

Upon receiving encapsulating Connection Assignment frame 2 (502), relaying node 402 processes frame 502 as specified in the relevant protocol for a one-hop star network, taking into account the above modifications.

In one embodiment, relaying node 402 does not send another encapsulating Connection Assignment frame with the frame payload set to encapsulated Connection Assignment frame 2 (501) to relayed node 403, after it (402) has already sent to relayed node 403 an encapsulating Connection Assignment frame 1 (407) with the frame payload set to encapsulated Connection Assignment frame 1 (406).

Control Type Frame Transmission without Frame Encapsulation

In one embodiment, control type frames may be transmitted without frame encapsulation.

If the hub may send a control type frame to a node in a one-hop star network, then the target hub may send the control type frame to the relaying node. The control type frame is sent with the modification that the Relay field in the MAC header is set to one or zero depending on whether relay is involved and feasible.

If a node may send a control type frame to a hub in a one-hop star network, then the relaying node may send the control type frame to the target hub. The control type frame is send with the modification that the Relay field in the MAC header is set to one or zero depending on whether relay is involved and feasible.

If the hub may send a control type frame to a node in a one-hop star network, then the relaying node may send the control type frame to the relayed node. The control type frame is send with the following modifications in the MAC header:
   the Relay field is set to one or zero depending on whether relay is involved and feasible;
   the Recipient ID field is set to the NID of the relayed node; and
   the Sender ID field is set to the NID of the relaying node.

Upon receiving a control type frame, the recipient node or hub processes the control type frame as specified in the relevant protocol for a one-hop star network with the additional considerations as noted above in defining the frame.

Selecting a Relaying Node for a Two-Hop Extension

In one embodiment, the relayed node or the target hub may select a prearranged relaying node, such as a previously used relaying node or a pre-identified relaying node.

In other embodiments, the relayed node may select a relaying node based upon frames recently received from a potential relaying node. For example, the relayed node may select a first node as its relaying node if the relayed node recently received acknowledgment frames sent from the first node to a target hub. The presence of such acknowledgement frames from the first node to the target hub lets the relayed node know that the first node is in communication with the target hub, even if the relayed node cannot detect the target hub itself. The relayed node may receive such acknowledgment frames based on frame reception rules, with appropriate exceptions given to the values of the Recipient ID and Sender ID fields of the MAC header of the frames.

Alternatively, the relayed node may select a second node as its relaying node if the relayed node recently received timed frames such as T-Poll frames locally broadcast by the second node.

The relayed node generally does not select more than one node as its relaying node at any given time. However, a relaying node may support multiple relayed nodes. In selecting a relaying node, the relayed node should take into account the quality of the links between itself and the relaying node and between the relaying node and the target hub.

Using Timed Frames for a Two-Hop Extension

FIG. 6 illustrates a process for using a scheduled uplink allocation for a relaying node to send timed frames, such as broadcast T-Polls, and to relay frames.

To facilitate a two-hop extension for relayed nodes, a relaying node may obtain scheduled uplink allocations 601 in accordance with the applicable rules specified for a one-hop star network. The relaying node may set the user priority of the allocation request to that for network control as defined for the one-hop star network.

In a scheduled uplink allocation 601-1, the relaying node locally broadcasts T-Poll frames 602 that are formatted as if the relaying node were sending the T-Poll frames as a hub. The MAC header of T-Poll frame 602 has the following format:
   the Relay field is set to 1; and
   the Sender ID field is set to a local-broadcast-NID.

Via T-Poll frame 602, the relaying node may provide an immediate (shared) polled allocation 603 within scheduled uplink allocation 602. Shared polled allocation 603 facilitates the selection of a relaying node and the synchronization with the target hub by potential relayed nodes. Additionally, shared polled allocation 603 provides a frame transmission opportunity to the relayed nodes for frame relay to the target hub. For example, a relayed node may send a frame 604 to the relaying node and receives a corresponding acknowledgement frame 605 from the relaying node during the shared allocation 603.

The relaying node may send frames 606 to the target hub in the same (601-1) or in a different (601-2) scheduled uplink allocation interval, wherein frames 606 were received by the relaying node from the relayed nodes for further transmission to the hub. The target hub may respond with the appropriate acknowledgement frame 607 during the scheduled uplink allocation interval (601-2).

Alternatively, the relaying node may send frames 608 to the relayed nodes in the same (601-1) or in a different (601-4) scheduled uplink allocation interval, wherein frames 608 were received from the target hub for further transmission to the relayed nodes. The addressed relayed node may respond with the appropriate acknowledgement frame 609 during the scheduled uplink allocation (601-4).

At other times (601-3), the relaying node may broadcast a T-Poll frame 610 that provides no immediate (shared) polled allocation within the scheduled uplink allocation interval.

A relayed node that does not directly receive beacons from the target hub may indirectly synchronize with the hub through reception of T-Poll frames that are sent by a relaying node in the same network.

A relayed node may send at most one frame to the relaying node in a shared polled allocation. The relayed node initially uses contention probability $P=\frac{1}{2}$. If the relayed node does not receive an expected acknowledgment from the relaying node, then it may retry sending the frame in another shared polled allocation that is conveyed by another T-Poll frame locally broadcast by the relaying node. In the subsequent shared polled allocations, the relayed node uses contention probability $P=\max(\frac{1}{8}, (\frac{1}{2})/\lceil (R+1)/2 \rceil)$ where R counts the retries of the frame. For example, R=1 for the first retry of the frame, R=2 for the second retry, and so on. The function $\lceil x \rceil$ is defined to be the least integer not smaller than x. With contention probability P, the relayed node transmits if $z \leq P$, where z is a value the relayed node has newly drawn at random from an interval [0, 1].

A relayed node may also send its frames to the relaying node in contended allocations it obtains according to the rules specified for a one-hop star network in a random access phase (RAP) or contention access phase (CAP) provided by the target hub. The relayed node may know the RAP and/or CAP locations, for example, through previously received beacons. The clock drift of the relayed node relative to the hub since its last direct synchronization with the hub should still be within the appropriate guard time if sending in a RAP or CAP. A node willing to serve as a relaying node as announced in its MAC Capability field should be ready to receive frames from relayed nodes during the RAPS and CAPs when it is not transmitting.

A relayed node is prohibited from sending a frame in a polled or contended allocation if the frame transmission and the expected acknowledgment plus an inter-frame spacing interval would not be located within the allocation. The relaying node should not provide an immediate shared polled allocation (603) that is not adequately long enough to support a frame transmission, expected acknowledgment, and inter-frame spacing interval.

In one embodiment, a relayed node sends only management type or control type frames in shared polled allocations. To transmit data type frames, the relayed node obtains scheduled allocations for its two-hop extension.

Using Improvised Access for a Two-Hop Extension

The target hub and the relaying node may obtain improvised polled and posted allocations according to the rules specified for a one-hop star network—as if they were a hub and a node, respectively, in a one-hop star network—to exchange data or management type frames originated from or destined to the relayed node.

The relaying node and the relayed node may obtain improvised polled and posted allocations in the scheduled uplink allocations applicable between the target hub and the relaying node according to the rules specified for a one-hop star network—as if they were a hub and a node, respectively, in a one-hop star network—to exchange data or management type frames originated from or destined to the target hub.

Using Scheduled Allocations for a Two-Hop Extension

FIG. 7 illustrates equivalent one-hop and two-hop scheduled allocations for uplink, downlink and bilink allocations. Either the relayed node or the target hub may initiate scheduled allocations for a two-hop extension as illustrated in FIG. 7 regardless of whether one-hope scheduled allocations have been obtained.

Allocation Request for a Two-Hop Extension

To obtain scheduled allocations for a two-hop extension, the relayed node sends an encapsulated Connection Request frame through the relaying node to the target hub, as illustrated in FIG. 2. In the encapsulated Connection Request frame, the relayed node includes an Uplink Request IE, a Downlink Request IE, or/and a Bilink Request IE. The request IEs specify equivalent scheduled allocations applicable between the relayed node and the target hub in a one-hop star network. If the relayed node currently holds a one-hop scheduled allocation, the Allocation ID field for each Allocation Request field in the request IEs is set to the Allocation ID that identifies the one-hop scheduled allocation.

Allocation Assignment for a Two-Hop Extension

The two-hop extension may be requested by the relayed node or by the hub. To grant scheduled allocations for a two-hop extension, the target hub sends an encapsulated Connection Assignment frame to the relaying node. The relaying node then sends the encapsulated Connection Assignment frame with some modifications to the relayed node as illustrated in FIG. 4.

In the encapsulated Connection Assignment frame, the target hub includes appropriate uplink assignment IEs, downlink assignment IEs, or/and bilink assignment IEs specifying the two-hop scheduled allocations (701) with the following matches to the corresponding one-hop scheduled allocations:

each allocation applicable (702) between the target hub and the relaying node for the two-hop extension has:
the same allocation direction (i.e., uplink for uplink, downlink for downlink, and bilink for bilink), and
approximately the same total allocation length as the equivalent allocation (701) applicable between the target hub and the relayed node in a one-hop star network.
each allocation (703) applicable between the relaying node and the relayed node for the two-hop extension has:
a bilink allocation direction, and
more total allocation length than the equivalent allocation applicable between the target hub and the relayed node in a one-hop star network, wherein the additional allocation length is provided for T-Poll frame transmissions by the relaying node.

In one embodiment, the target hub takes into account the overall latency that results from a two-hop extension in specifying the two-hop scheduled allocation intervals (702, 703).

Using Scheduled Allocations for a Two-Hop Extension

Upon successful transmission of the encapsulating Connection Assignment frame from the target hub to the relaying node, the target hub and the relaying node use their scheduled allocations—as conveyed in the encapsulated Connection Assignment frame—to exchange frames originated from or destined to the relayed node as if they were a hub and a node, respectively, in a one-hop star network. The scheduled allocations may be uplink, downlink, or bilink allocations. The frames may be data or management type frames.

Upon successful transmission of the encapsulating Connection Assignment frame from the relaying node to the relayed node, the relaying node and the relayed node use their scheduled bilink allocations—as conveyed in the encapsulated Connection Assignment frame—to exchange data type frames originated from or destined to the target hub as if they were a hub and a node, respectively, in a one-hop star network.

In one embodiment, the relaying node sends one or more T-Poll frames to the relayed node in each allocation interval of the bilink allocations, and the relayed node should perform its clock synchronization based on received T-Poll frames.

Modifying Scheduled Allocations for a Two-Hop Extension

The relayed node and the target hub may modify their two-hop scheduled allocations via further exchanges of Connection Request or/and Connection Assignment frames as if they were a node and a hub in a one-hop star network and with the additional considerations discussed above in connection with FIGS. 4 and 5 for the Connection Assignment frames for a two-hop extension.

Aborting Scheduled Allocations for a Two-Hop Extension

The target hub and the relaying node may abort their two-hop scheduled allocations (702) as if they were a hub and a node in a one-hop star network. The hub may subsequently reclaim any aborted scheduled allocations.

Once the relaying node aborts its two-hop scheduled allocations (702) applicable with the target hub, the relaying node also aborts its two-hop scheduled allocations (703) applicable with the relayed node. The relaying node and the relayed node abort their two-hop scheduled allocations as if they were a hub and a node, respectively, in a one-hop star network.

In one embodiment, the target hub, the relaying node, and the relayed node each transmit at least one frame requiring an immediate return of a frame in every allocation interval of their two-hop scheduled allocations to reduce the chance of experiencing an abortion of the two-hop scheduled allocations.

Ending Scheduled Allocations for a Two-Hop Extension

The relayed node or the target hub may initiate to end their two-hop scheduled allocations at any time the initiator determines appropriate. The termination of the two-hop scheduled allocations may or may not be in exchange for regaining equivalent one-hop scheduled allocations.

When the relaying node determines that its relay between the relayed node and target hub is no longer required or feasible, it may end the relay. The relaying node may terminate the two-hop scheduled allocations (702,703) applicable between the relayed node and the target hub using any acknowledgement frame that the relaying node is required to send in response to a frame received from the relayed node or the target hub. The relaying node may set the Relay field of the MAC header of the required acknowledgement frame to zero to indicate that the relay has ended or is not available. The relaying node may support multiple relayed nodes. When the relaying node ends the relay for one relayed node, it should keep the two-hop scheduled allocations applicable between any other relayed nodes and the target hub as long as its relay between the other relayed nodes and the target hub is feasible and desirable.

A relayed node, a relaying node, or a target hub should not send a frame in an already ended scheduled allocation.

Ending in Exchange for Equivalent One-Hop Scheduled Allocations

The relayed node may request to replace the two-hop scheduled allocations with equivalent one-hop scheduled allocations. In one embodiment, the relayed node does this by sending a Connection Request frame directly to the target hub as in a one-hop star network, where the frame specifies the one-hop scheduled allocations using the Allocation IDs for the two-hop scheduled allocations. The relayed node should send the frame in a scheduled allocation applicable between itself and the relaying node.

The target hub may replace the two-hop scheduled allocations with equivalent one-hop scheduled allocations either in response to a request from the relayed node or on its own decision. To replace the two-hop scheduled allocations with equivalent one-hop scheduled allocations, the target hub:

sends an encapsulated Connection Assignment frame to the relaying node, where the encapsulated Connection Assignment frame is formatted to end the two-hop scheduled allocations, and sends a Connection Assignment frame directly to the relayed node, where the Connection Assignment frame is formatted to specify the granted one-hop scheduled allocations in a one-hop star network.

The target hub sends the encapsulated Connection Assignment frame to the relaying node in a scheduled allocation between itself and the relaying node. The target hub sends the Connection Assignment frame directly to the relayed node in a scheduled allocation currently or previously applicable between the relaying node and the relayed node.

Ending without Regaining Equivalent One-Hop Scheduled Allocations

The relayed node may request to end the two-hop scheduled allocations without regaining equivalent one-hop scheduled allocations. To do this, the relayed node sends a Connection Request frame directly to the target hub as in a one-hop star network. This Connection Request frame is formatted with the Allocation IDs for the two-hop scheduled allocations to end the equivalent one-hop scheduled allocations. The relayed node sends the frame in a scheduled allocation applicable between itself and the relaying node.

The target hub may end the two-hop scheduled allocations without regaining equivalent one-hop scheduled allocations either in response to a request from the relayed node or on its own decision. To do this, the target hub sends two encapsulated Connection Assignment frames 1 and 2 in two encapsulating Connection Assignment frames 1 and 2 to the relayed node and the relaying node, respectively, as described above with respect to FIGS. 4 and 5. These encapsulated Connection Assignment frames are formatted to end the two-hop scheduled allocations.

FIG. 8 is a block diagram of an exemplary embodiment of a device 800 implementing embodiments of the invention. Device 800 may be used as a relayed node, a relaying node, and/or a target hub. Processor 801 processes frames transmitted to or received from a target hub, a relaying node, and/or a relying node. The frames may be transmitted and received via transceiver 802 and antenna 803. In other embodiments, the frames may be transmitted and received via wireline interface 804, which is coupled to the Internet or other network 805. Where device 800 is a medical implant device in a Body Area Network (BAN), the wired connection may not be present or may be unused unless the device is accessible externally. Processor 801 may be a software, firmware, or hardware based component, or a combination thereof. Processor 801 may also control the transmission and reception of frames with a target hub, relaying node, and/or relayed node.

Memory 806 may be used to store frames and computer program instructions, software and firmware used by processor 801, and any other parameters needed in the course of communication described in the above. It will be understood that memory 806 may be any applicable storage device, such as a fixed or removable RAM, ROM, flash memory, or disc drive that is separate from or integral to processor 801. Device 800 may be coupled to other devices, such as user interface 807, sensors 808, or other devices or equipment 809.

Device 800 may be adapted to operate in a BAN either as a node or as a hub that is controlling a plurality of nodes. Sensors 808 may be used, for example, to monitor vital patient data, such as body temperature, heart rate, and respiration. Equipment 809 may be, for example, a monitor or other device that receives and analyzes signals, such as a patient's temperature, heart rate, and respiration, from another node. Alternatively, equipment 809 may be a device for providing a service to a patient, such as controlling an intravenous drip, respirator, or pacemaker.

It will be understood that the device 800 in FIG. 8 is presented for illustrative purposes only and is not intended to limit the scope of the systems or devices that are capable of employing the two-hop star extension procedures described herein.

The two-hop star topology extension described herein may be used in a Body Area Network (BAN) or in any other network or system in which it would be useful to provide communications between two devices through a relaying node, such as in the systems described in U.S. patent application Ser. No. 12/539,733, filed Aug. 12, 2009, and titled "Public Key Out-of-Band Transfer for Mutual Authentication," U.S. patent application Ser. No. 12/697,080, filed Jan. 29, 2010, and titled "Pairwise Temporal Key Creation for Secure Networks," U.S. patent application Ser. No. 12/697,086, filed Jan. 29, 2010, and titled "Authentication and Encryption for Secure Data Transmission," U.S. patent application Ser. No. 12/697,092, filed Jan. 29, 2010, and titled "Mitigation of Interference between Wireless Networks," U.S. patent application Ser. No. 12/697,098, filed Jan. 29, 2010, and titled "Smart Adjustment of Backoff Counter and Contention Window for Improved Random Access," U.S. patent application Ser. No. 12/697,105, filed Jan. 29, 2010, and titled "Access and Power Management for Centralized Networks," U.S. patent application Ser. No. 12/697,110, filed Jan. 29, 2010, and titled "Frame Structure for Medium Access in Body Area Networks (BAN)," U.S. patent application Ser. No. 12/697,113, filed Jan. 29, 2010, and titled "Password-Authenticated Association Based on Public Key Scrambling," U.S. patent application Ser. No. 12/849,797, filed Aug. 3, 2010, and titled "System and Method for Simultaneous Infrastructure and Ad Hoc Networked Communications," U.S. patent application Ser. No. 12/856,167, filed Aug. 13, 2010, and titled "Implant Access in the Medical Implant Communications Service Band," U.S. patent application Ser. No. 12/896,243, filed Oct. 1, 2010, and titled "Methods and Systems for Improving the Security of Password-Based Authentication Protocols for IEEE 802.11 Networks," and U.S. patent application Ser. No. 12/963,942, filed Dec. 9, 2010, and titled "Address Space Partitioning and Filtering for Discretionary Wireless Connection Response," the disclosures of which are hereby incorporated in their entirety herein.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method for relaying frames in a network, comprising:
   broadcasting a timed frame, by the relaying node, during a first scheduled uplink allocation interval, wherein the timed frame provides a shared polled allocation interval within the scheduled uplink allocation interval, wherein the second encapsulating frame is transmitted to the target hub during a second scheduled uplink allocation;
   sending a first encapsulating frame by a relayed node in the shared polled allocation using a first contention probability ($P_1=\frac{1}{2}$);
   monitoring for an acknowledgement to the first encapsulating frame from the relaying node;
   if the acknowledgement is not received, then broadcasting the first encapsulating frame for a number of retries using a second contention probability ($P_2=\max(\frac{1}{8}, (\frac{1}{2})/\lceil (R+1)/2 \rceil)$) until the acknowledgement is received, where R counts a number of retries of the first encapsulating frame, and the function $\lceil x \rceil$ is defined to be a least integer not smaller than x;
   receiving the first encapsulating frame at a relaying node from the relayed node, the first encapsulating frame having a payload comprising an encapsulated frame;
   generating a second encapsulating frame at the relaying node, the second encapsulating frame having a payload comprising the encapsulated frame; and
   transmitting the second encapsulating frame to a target hub.

* * * * *